United States Patent [19]

Schupp et al.

[11] 4,340,714
[45] Jul. 20, 1982

[54] PREPARATION OF CURABLE POLYADDUCTS, CONTAINING BASIC NITROGEN GROUPS, AND USE OF THE PRODUCTS

[75] Inventors: Eberhard Schupp, Schwetzingen; Fritz E. Kempter, Mannheim; Erich Gulbins, Heidelberg-Neuenheim, all of Fed. Rep. of Germany

[73] Assignee: BASF Aktiengesellschaft, Fed. Rep. of Germany

[21] Appl. No.: 266,363

[22] Filed: May 22, 1981

[30] Foreign Application Priority Data

Jun. 6, 1980 [DE] Fed. Rep. of Germany ....... 3021300

[51] Int. Cl.³ ..................... C08G 59/14; C08G 59/28
[52] U.S. Cl. ..................................... 528/99; 528/104; 528/107; 525/380; 525/523; 204/181 C
[58] Field of Search ................. 260/29.2 EP; 528/99, 528/104, 107; 525/523, 380

[56] References Cited

U.S. PATENT DOCUMENTS

| | | | |
|---|---|---|---|
| 3,312,664 | 4/1967 | Bremmer | 260/47 |
| 3,365,471 | 1/1968 | Becke et al. | 260/348 |
| 3,391,097 | 7/1968 | Williamson | 260/18 |
| 3,450,711 | 6/1969 | Megna et al. | 260/326 |
| 3,503,979 | 3/1970 | Habermeier et al. | 260/260 |
| 3,839,447 | 10/1974 | Swiger et al. | 260/562 P |

FOREIGN PATENT DOCUMENTS

2236842 7/1972 Fed. Rep. of Germany.
2934467 3/1980 Fed. Rep. of Germany.
1172916 12/1969 United Kingdom.

OTHER PUBLICATIONS

"Organikum", VEB Deutscher Verlag der Wissenschaften (1967), pp. 492–494.

Primary Examiner—Earl A. Nielsen
Attorney, Agent, or Firm—Keil & Witherspoon

[57] ABSTRACT

A process for the preparation of curable polyadducts, possessing basic nitrogen groups, wherein (A) monophenols and/or polyphenols, which contain groups of the general formula (I):

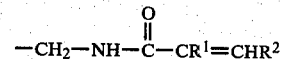

where $R^1$ and $R^2$ are identical or different and each is hydrogen or methyl are reacted with (B) amines having one or more primary and/or secondary amino groups, and the adduct formed is reacted with (C) epoxide compounds having from 1 to 4 epoxide groups per molecule and having a molecular weight of at most 2,500, the ratio of the phenolic hydroxyl groups of (A) to epoxide groups of (C) being from 1:0.5 to 1:2 and the amine (B) being employed in such amount that the resulting polyadduct of (A), (B) and (C) contains from 0.1 to 5% by weight of basic nitrogen, and the use of the products, after protonation with an acid, as binders for the production of coatings, especially for the cathodic electrocoating of metal articles.

11 Claims, No Drawings

PREPARATION OF CURABLE POLYADDUCTS, CONTAINING BASIC NITROGEN GROUPS, AND USE OF THE PRODUCTS

The present invention relates to a process for the preparation of curable polyadducts, containing basic nitrogen groups, and to their use as binders for the production of coatings, especially for the cathodic electrocoating of metal articles.

German Laid-Open Application DOS No. 2,934,467 describes products, suitable for electrocoating, which are prepared by adduct formation of amines with polymeric materials having $\alpha,\beta$-unsaturated amide groups, whose amide groups are, however, bonded to the polymer molecule via methylol ether bridges. These products have little resistance to hydrolysis.

Polyadducts which bear basic nitrogen groups and which contain groups of the formula (I) bonded to aromatic rings, and the use of these polyadducts as binders for cathodic electrocoating, have already been proposed in German Patent Application No. P 29 42 488.2.

It is an object of the present invention to provide a novel process which permits the preparation of such polyadducts, containing basic nitrogen groups, in a simple manner, and gives products which are further improved in their technical properties, especially in respect of the solvent resistance of the coatings obtained with the products.

We have found that this object is achieved by a process for the preparation of curable polyadducts containing basic nitrogen groups, wherein:

(A) monophenols and/or polyphenols, which contain groups of the general formula (I):

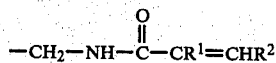

where $R^1$ and $R^2$ are identical or different and each is hydrogen or methyl, are reacted with (B) amines having one or more primary and/or secondary amino groups, and the adduct formed is reacted with (C) epoxide compounds having from 1 to 4 epoxide groups per molecule and having a molecular weight of at most 2,500, the components (A) and (C) being employed in such amounts that the ratio of phenolic hydroxyl groups of (A) to epoxide groups of (C) is from 1:0.5 to 1:2 and the amine (B) being employed in such amount that the resulting polyadduct of (A), (B) and (C) contains from 0.1 to 5% by weight of basic nitrogen.

The present invention further relates to the use of the products prepared according to the invention for the production of coatings and in particular to their use, in the protonated form obtained by addition of acids, as a binder for the cathodic electrocoating of metal articles.

In the polyadducts according to the invention, the amide groups are linked to the polymer molecule via inert carbon-carbon bonds. The coatings obtained with the products afford excellent corrosion protection and have excellent solvent resistance.

In the process according to the invention, the amine (B) undergoes adduct formation at the carbon-carbon double bond of the group of the general formula (I) of component (A). In contrast, in the process described in the Examples of German Patent Application No. P 29 42 488.2, the amine reacts with the epoxide groups of polyepoxide compounds.

The adduct formation of amines with $\alpha,\beta$-unsaturated carbonyl compounds is described in, for example, "Organikum", page 492, VEB Deutscher Verlag der Wissenschaften, 1967.

Regarding the preparation of the novel polyadducts, and the components from which they are synthesized, the following details may be noted:

(A) The monophenols and/or polyphenols (A) which contain $\alpha,\beta$-olefinically unsaturated amidomethyl groups have, as substituents on the aromatic nucleus, groups of the general formula:

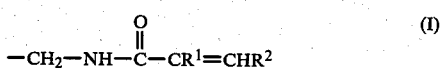

where $R^1$ and $R^2$ are identical or different radicals and each is hydrogen or methyl. Preferred groups of the formula (I) are those where $R^1$ is hydrogen or methyl and $R^2$ is hydrogen. These monophenols and/or polyphenols containing $\alpha,\beta$-unsaturated amidomethyl groups can be prepared from phenols or polyphenols and compounds of the formula:

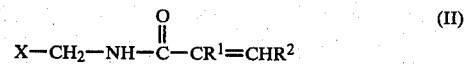

where X is OH, halogen, eg. chlorine, or alkoxy of 1 to 8, preferably of 1 to 4, carbon atoms, and $R^1$ and $R^2$ are as defined above.

Suitable phenols are monophenols and/or polyphenols, especially diphenols of the general formula:

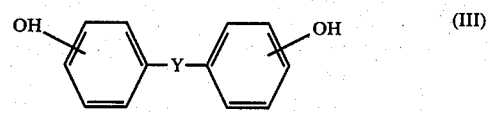

where the OH groups are in the ortho-position and/or para-position to Y, and Y is a straight-chain or branched divalent aliphatic radical of 1 to 3 carbon atoms or is $-SO_2-$, $-SO-$, $-S-$, $-CO-$ or $-O-$; 2,2-bis-p-hydroxyphenylpropane (bisphenol A) is a preferred compound.

Phenol-modified butadiene oils, for example those disclosed in German Laid-Open Application DOS No. 2,236,842, can also be used as the polyphenols. In that case, it is often not necessary to distil off the excess phenol employed in the phenol modification reaction, provided this excess has been selected so that it corresponds to the desired amount of monophenol required for molecular weight adjustment of the binders.

To adjust the molecular weight of the novel binders to the desired value, it is advantageous to replace a proportion of the diphenols by monophenols. If a proportion of monoepoxide compound is present in the reaction, the use of monophenols can be dispensed with. Suitable monophenols are those which contain an H atom in one or both of the ortho-positions and/or in the para-position to the phenolic OH group, for example phenol, cresols, $\alpha$- and $\beta$-naphthol, o- and p-tert.butylphenol, cardanol and the like. Cardanol is a naturally occurring product and consists of a mixture of long-chain 3-alkylenephenols, where alkylene is of about 13 to 17 carbon atoms, for example 3-(pentadeca-8,11- dienyl)phenol. As a result of these alkylene chains, the presence of cardanol results in binders with which particularly resilient coatings can be produced.

The reaction of the phenol with the compound of the formula (II) can be carried out within a wide temperature range, in the presence or absence of a solvent, such as toluene, xylene, isobutanol, ethylglycol, ethylhexanol and the like.

If a strong acid, such as HCl, is used as the catalyst, the reaction can be carried out at about 0° C., whilst with a weaker acid catalyst temperatures of up to about 160° C. may be needed. It is also possible to prepare a compound of the formula (II) in situ and react it with the phenol in question. For example, in place of using methylolacrylamide, a mixture of acrylamide and paraformaldehyde can be reacted with 2,2-bis-p-hydroxyphenyl-propane in the presence of a catalytic amount of sulfuric acid to give the corresponding diphenol having an α,β-olefinically unsaturated amidomethyl group.

The reaction of a phenol with a compound of the formula (II) results in elimination of HX and amidomethylation at the aromatic nucleus of the phenol. Such reactions are known as Tsherniac-Einhorn reactions. The reaction of 2,2-bis-p-hydroxyphenyl-propane with N-methylolacrylamide in glacial acetic acid, using HCl as the catalyst, is described in U.S. Pat. No. 3,839,447. The diphenols, bearing α,β-olefinically unsaturated amidomethyl groups, which are thus obtainable can be employed to prepare the novel polyadducts. The additional use of, for example, N-methylol-fatty acid amides provides a simple method of adding, onto the phenol, groups which increase the flexibility of the final product.

From 0.3 to 2.5 moles of the compound of the formula (II) can be employed per equivalent of phenol (ie. per equivalent of phenolic OH group). In general, however, from 0.5 to 2.0 moles per equivalent of phenol suffice to achieve optimum density of crosslinking in the finished surface-coating film.

(B) The amines used according to the invention can be any primary or secondary amines, for example those of the general formula H₂N—R³ or

where R³ and R⁴ are identical or different alkyl of 1 to 18 carbon atoms or are hydroxyethyl or hydroxyisopropyl, or together form a 5-membered or 6-membered ring.

Examples of primary or secondary amines which can be employed are monoalkylamines and dialkylamines, eg. methylamine, ethylamine, propylamine, isopropylamine, butylamine, isobutylamine, s-butylamine, dimethylamine, diethylamine, dipropylamine, dibutylamine, pyrrolidine, piperidine, morpholine, and the like. The amines can also bear additional functional groups, such as hydroxyl, and can be, for example, alkanolamines of 2 to 4 carbon atoms in the alkanol groups, eg. ethanolamine, isopropanolamine, 3-aminopropanol, diethanolamine, diisopropanolamine and the like.

Amines with a plurality of basic nitrogen atoms can also be employed, for example 3-dimethylaminopropylamine, 3-diethylaminopropylamine, piperazine, N-methylpiperazine and the like. In general, low molecular weight amines are used, but amines of higher molecular weight can also be employed, especially if the plasticizing action of these amines is desirable. A mixture of low molecular weight and higher molecular weight amines can also be used.

Preferred amines are alkanolamines, especially diethanolamine, and N-hydroxyethylpiperazine.

(C) The polyepoxide compounds used can be any conventional epoxy resin, for example the diglycidyl ethers of bisphenol A, which can be prepared, for example, from bisphenol A and epichlorohydrin in the presence of an alkali. The polyglycidyl ethers, of molecular weight 180–2,500, of polyhydric alcohols, for example of pentaerythritol, glycerol, trimethylolpropane, ethylene glycol, diethylene glycol, polyoxyethylene glycols and polyoxypropylene glycols having molecular weights of from 200 to 2,000, and other polyhydric, preferably dihydric, trihydric or tetrahydric, alcohols can also be used.

Further suitable polyepoxide compounds are nitrogen-containing diepoxides, as described, for example, in U.S. Pat. No. 3,365,471, epoxy resins obtained from 1,1-methylene-bis-(5-substituted hydantoin), as described in U.S. Pat. No. 3,391,097, diepoxides obtained from bis-imides, as described in U.S. Pat. No. 3,450,711, epoxidized aminomethyl-diphenyl oxides as described in U.S. Pat. No. 3,312,664, heterocyclic N,N'-diglycidyl compounds as described in U.S. Pat. No. 3,503,979, aminoepoxy-phosphates as described in British Pat. No. 1,172,916, 1,3,5-triglycidyl isocyanurates and other industrially well-known materials containing epoxide groups, for example dicyclopentadiene dioxide, limonene dioxide and epoxidized butadiene oils.

Polyacrylates bearing epoxide groups can also be used as polyepoxide compounds for the preparation of the novel polyadducts. These resins can be prepared, for example, by copolymerizing an unsaturated epoxide-containing monomer, eg. glycidyl acrylate or glycidyl methacrylate, with one or more other unsaturated monomers.

A proportion of monoepoxide compounds can also be present, provided this is desirable, for example for adjusting the molecular weight of the binder. Glycidyl esters of long-chain carboxylic acids, for example ®Cardura E from Shell, or glycidyl ethers of long-chain alcohols, can also be used, if the binder is to be plasticized, thereby giving more resilient coatings.

According to the invention, the components (A) and (C) are employed in such amounts that the ratio of the phenolic hydroxyl groups of component (A) to the epoxide groups of component (C) is from 1:0.5 to 1:2, preferably from 1:0.8 to 1:1.6.

The adduct formation of the amines (B) with the double bonds of the monophenols and/or polyphenols (A), bearing groups of the formula (I), can be effected by simply mixing components (A) and (B), but in general heating at 50°–110° C. is advantageous in order to accelerate the rate of adduct formation. The amount of amine employed determines the content of basic nitrogen in the finished binder. It is in general selected so that the binder contains from about 0.1 to 5% by weight, preferably 0.75–3% by weight, of basic nitrogen. The reaction is advantageously carried out in a solvent, for example in an alcohol, eg. isopropanol, n-butanol or iso-butanol, in a hydrocarbon, eg. benzene or toluene, or in some other industrial solvent or solvent mixture which dissolves the components. The subsequent reaction with component (C) is advantageously carried out at from 50° to 110° C. The progress of the reaction can be followed by determining the epoxide groups or phenolic groups still present, or by measuring the viscosity.

Another possible way of carrying out the novel process of preparation is to add the amine (B) and epoxide compound (C) simultaneously to the monophenols and/or polyphenols which bear the groups of the formula (I), ie. to the compounds (A). In this case, again, a rapid and exothermic adduct formation of the amines with the unsaturated groups of the phenols takes place, whilst the subsequent reaction of the phenolic OH groups with the epoxide groups occurs much more slowly. With this simultaneous addition of the reactants, a certain amount of adduct formation of the amine with the epoxide groups may also occur, but this in general does not detract from the quality and usefulness of the polyadduct obtained.

The polyadducts prepared according to the invention, diluted with conventional surface-coating solvents, such as alcohols with chains of 1 to 16 carbon atoms, for example methanol, isopropanol, decanol, n-butanol and iso-butanol, alkylaromatics, eg. toluene, cycloaliphatics, (oligomeric) glycols and glycol ethers or aqueous organic solvent mixtures, and with or without the addition of pigments, fillers and conventional surface-coating assistants, can be applied to the substrate to be coated or finished, for example to wood, metal, glass or ceramic, by conventional coating methods, such as spraying, dipping or flooding, and can then be dried, and cured at above 170° C. The coatings thereby obtained are distinguished by, for example, great hardness and solvent resistance.

The novel polyadducts can also be cured advantageously by irradiation with infrared, ultraviolet or electron beams, in which case the products may or may not be mixed with reactive diluents, such as monoacrylates and diacrylates and, in the case of ultraviolet curing, advantageously contain conventional ultraviolet initiators, such as benzoin ethers or benzil ketals.

Preferably, however, the novel surface-coating binders are employed after being protonated with acids, for example phosphoric acid and its derivatives or preferably, water-soluble carboxylic acids, eg. acetic acid, formic acid or lactic acid. The protonated surface-coating binder is water-dilutable and can be applied by the conventional coating methods mentioned above, again giving coatings having very valuable properties.

The preferred use of the novel protonated polyadducts is as surface-coating binders for the cathodic electrocoating of electrically conductive surfaces, for example of metal articles, sheets and the like made of brass, copper, aluminum, iron and steel, which may or may not be chemically pretreated, for example phosphatized.

The aqueous solutions or dispersions of the novel polyadducts, which are at least partially in the form of salts with a water-soluble acid can also contain auxiliaries which can be electrochemically deposited by cataphoresis, such as pigments, eg. carbon black, talc, titanium dioxide, kaolin, basic lead chromate, iron oxide pigments and the like, soluble dyes, solvents, flow control agents, stabilizers, curing catalysts, anti-foam agents and other assistants and additives.

For cathodic electrocoating, the solids content of the bath is in general brought to 5-30% by weight by dilution with demineralized water. The electrocoating is in general carried out at from 15° to 40° C., for from 1 to 2 minutes, at a bath pH of from 4.0 to 8.5, preferably from 5.0 to 7.5, and at a deposition voltage of from 50 to 500. The film cathodically deposited onto the electrically conductive article is then rinsed, dried and cured at from about 140° to 200° C. for from 10 to 30 minutes, preferably at from 160° to 180° C. for about 20 minutes.

The Examples which follow, and in which parts and percentages are by weight, illustrate the invention without implying any limitation thereof.

PREPARATION EXAMPLES

Preparation of component A

Component $A_1$ 0.1 part of copper powder is added to 228 parts of bisphenol A, 94 parts of phenol, 213 parts of acrylamide and 99 parts of paraformaldehyde and the batch is heated slowly. At 80° C., the mixture has substantially liquefied. It is then heated to 115° C. and kept at this temperature for 10 minutes, during which the batch becomes completely clear. It is cooled to 55°-60° C. and 3 parts of boron trifluoride diethyl etherate are added. The mixture is kept at 60° C., cooling being required initially, and after 1 hour a further 3 parts of etherate are added. The batch is then kept at 60° C. for a further 3 hours, after which it is diluted with 250 parts of isobutanol. This mixture is then brought to the boil and about 50 parts of water are removed in the course of 90 minutes. The product has a solids content of 70%.

Component $A_2$ 0.1 part of copper powder is added to 152 parts of bisphenol A, 62.6 parts of phenol and 202 parts of methylolacrylamide and the batch is heated to 80° C. The clear solution formed is cooled to 60° C. and 2 parts of boron trifluoride diethyl etherate are added. After 1 hour's stirring at 60° C., a further 2 parts of etherate are added. After 3 hours at 60° C., 167 parts of isobutanol are introduced and about 30 parts of water are removed in the course of 90 minutes. The product has a solids content of 69%.

Component $A_3$ 76.6 parts of paraformaldehyde, 90 parts of oleic acid amide and 0.1 part of copper powder are added to 182.4 parts of bisphenol A, 37.6 parts of phenol and 142 parts of acrylamide. The mixture is briefly heated to 120° C. until a clear solution has formed and is then cooled to 50° C., and 2 parts of boron trifluoride diethyl etherate are added. The batch is kept for 1 hour at 50°-55° C., cooling being required initially, a further 2 parts of etherate are then added and the mixture is kept for 1 hour at 50°-55° C. and then for 2 hours at 60° C. It is then diluted with 209 parts of isobutanol and refluxed, 35 parts of water being removed in the course of 90 minutes.

Component $A_4$

The procedure followed is similar to that described for component $A_3$ except that the oleic acid amide is omitted, and only 66 parts of paraformaldehyde are used, and that the product is diluted with only 168 parts of isobutanol.

Component A₅

6.3 parts of paraformaldehyde and 0.1 part of copper powder are added to 94 parts of phenol and 202 parts of methylolacrylamide. The batch is heated at 100° C. until all has dissolved and is then cooled to 55° C., and 1 part of boron trifluoride diethyl etherate is added. After 1 hour at 55°–60° C., the same amount of catalyst is added again, and the batch is kept at 60° C. for 3 hours. It is then heated to 115° C. and kept at this temperature for 30 minutes, in the course of which about 20 parts of water distil off. Thereafter it is cooled to 80° C. and diluted with 120 parts of isobutanol.

EXAMPLE 1

138 parts of component $A_1$ are heated to 70° C., 19.7 parts of diethanolamine and 8.1 parts of hydroxyethylpiperazine are added and the mixture is kept at 75°–80° C. for 1 hour. 54 parts of isopropanol and 99 parts of a diglycidyl ether of bisphenol A and epichlorohydrin, having an epoxide equivalent weight of 189, are added and the batch is then stirred at 70° C. until the viscosity, measured at 75° C. on a plate-and-cone viscometer, is 2,440 mPa.s; about 7 hours are required to reach this viscosity. 9 parts of acetic acid and 50 parts of water are then added and an electrocoating bath having a 10% solids content and a pH of 6.1 is prepared from the mixture by dilution with demineralized water.

EXAMPLE 2

The procedure described in Example 1 is followed but using 138 parts of component $A_2$ instead of 138 parts of component $A_1$.

EXAMPLE 3

175 parts of component $A_3$ and 26.25 parts of diethanolamine are heated for 1 hour at 75°–80° C. 72 parts of isopropanol and 142 parts of a diglycidyl ether of bisphenol A and epichlorohydrin, having an epoxide equivalent weight of 189, are added and the batch is then stirred at 85° C. until the viscosity, measured at 75° C. on a plate-and-cone viscometer, is 2,440 mPa.s; about 10 hours are required to reach this viscosity. 20 parts of a polybutadiene oil, of molecular weight 3,000, having 80% 1,4-cis, 19% trans and 1% 1,2-vinyl configuration, 9 parts of acetic acid and 10 parts of water are then added and the mixture is diluted with demineralized water to give an electrocoating bath having a solids content of 11%.

EXAMPLE 4

140 parts of component $A_4$ and 31.5 parts of diethanolamine are stirred for 1 hour at 75°–80° C. 142 parts of the diglycidyl ether of bisphenol A and epichlorohydrin, used in Example 2, 14 parts of a polyglycidyl ether obtained from pentaerythritol and epichlorohydrin having a chlorine content of 12% and an epoxide equivalent weight of 160, and 80 parts of isopropanol are added and the mixture is then stirred at 85° C. until the viscosity, measured at 75° C. on a plate-and-cone viscometer, is 2,480 mPa.s; about 8 hours are required to reach this viscosity. 20 parts of the polybutadiene oil used in Example 3, 9 parts of acetic acid and 50 parts of water are then added, and an electrocoating bath having a solids content of 11% is prepared by dilution with demineralized water.

Results of testing the binders

1% of ethylhexanol was added to each electrocoating bath, and the bath was then aged for 24 hours at 25° C. In Examples 1, 3 and 4, 50 ppm of lead, in the form of lead acetate, were also added. Thereafter, both zinc-phosphatized and untreated steel sheets were cataphoretically coated and then baked for 20 minutes at 180° C. The coatings were then scored and subjected to the ASTM salt spray test (DIN SS 50, 021).

|  | zinc-phosphatized steel | | | untreated steel | | |
|---|---|---|---|---|---|---|
|  | Coating voltage | Coating thickness | ASTM test 480 h | Coating voltage | Coating thickness | ASTM test 480 h |
| Example 1 | 130 V | 16 μm | 1.5 mm | 80 V | 17 μm | 1 mm |
| Example 2 | 140 V | 16 μm | 2 mm | 140 V | 17 μm | 2 mm |
| Example 3 | 130 V | 15 μm | 1-1.5 mm | 130 V | 16 μm | 1-3 mm |
| Example 4 | 170 V | 16 μm | 1-2 mm | 90 V | 15 μm | 2-3 mm |

We claim:

1. A process for the preparation of a curable polyadduct, containing basic nitrogen groups, which after protonation with an acid can be used as a binder for the production of coatings, in particular for the cathodic electrocoating of metal articles, wherein (A) monophenols or polyphenols, or mixtures of monophenols and polyphenols, which contain groups of the general formula (I)

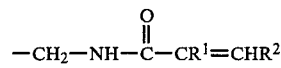

where $R^1$ and $R^2$ are identical or different and each is hydrogen or methyl are reacted with (B) amines having one or more primary or secondary amino groups or one or more primary and one or more secondary amino groups, and the adduct formed is reacted with (C) epoxide compounds having from 1 to 4 epoxide groups per molecule and having a molecular weight of at most 2,500, the components (A) and (C) being employed in such amounts that the ratio of phenolic hydroxyl groups of (A) to epoxide groups of (C) is from 1:0.5 to 1:2 and the amine (B) being employed in such amount that the resulting polyadduct of (A), (B) and (C) contains from 0.1 to 5% by weight of basic nitrogen.

2. A process as claimed in claim 1, wherein component (A), having groups of the general formula (I), is a reaction product of a monophenol or polyphenol, or of a mixture of monophenols and polyphenols, and a compound of the general formula (II):

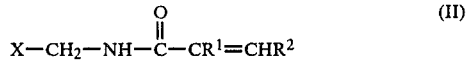

where X is OH, halogen or alkoxy of 1 to 8 carbon atoms and $R^1$ and $R^2$ are identical or different and each is hydrogen or methyl.

3. A process as claimed in claim 2, wherein the compound of the general formula (II) is N-methylolacrylamide or N-methylolmethacrylamide.

4. A process as claimed in claim 3, wherein, in place of N-methylolacrylamide or N-methylolmethacrylamide, a mixture of acrylamide or methacrylamide and formaldehyde or a formaldehyde donor is used in the presence of an acidic catalyst.

5. A process as claimed in claim 2, wherein the polyphenol is 2,2-bis-p-hydroxyphenyl-propane (=bisphenol A).

6. A process as claimed in claim 3, wherein the polyphenol is 2,2-bis-p-hydroxyphenyl-propane (=bisphenol A).

7. A process as claimed in claim 4, wherein the polyphenol is 2,2-bis-p-hydroxyphenyl-propane (=bisphenol A).

8. A process as claimed in claim 1, wherein component (B) is a secondary amine containing one or two hydroxyalkyl groups.

9. A process as claimed in claim 2, wherein component (B) is a secondary amine containing one or two hydroxyalkyl groups.

10. A process as claimed in claim 1, wherein component (C) is a diglycidyl ether of bisphenol A, obtained from bisphenol A and epichlorohydrin.

11. A process as claimed in claim 2, wherein component (C) is a diglycidyl ether of bisphenol A, obtained from bisphenol A and epichlorohydrin.

* * * * *